(12) United States Patent
Marc

(10) Patent No.: US 8,614,669 B2
(45) Date of Patent: Dec. 24, 2013

(54) TOUCHLESS TABLET METHOD AND SYSTEM THEREOF

(75) Inventor: Boillot Andre Marc, Plantation, FL (US)

(73) Assignee: NaviSense, Plantation, FL (US)

(*) Notice: Subject to any disclaimer, the term of this patent is extended or adjusted under 35 U.S.C. 154(b) by 1446 days.

(21) Appl. No.: 11/683,416

(22) Filed: Mar. 7, 2007

(65) Prior Publication Data
US 2007/0211031 A1 Sep. 13, 2007

Related U.S. Application Data

(60) Provisional application No. 60/781,177, filed on Mar. 13, 2006.

(51) Int. Cl.
*G06F 3/033* (2006.01)
*G09G 5/08* (2006.01)

(52) U.S. Cl.
USPC ......................................................... 345/158

(58) Field of Classification Search
USPC ................ 178/18.04, 18.09, 19.02, 19.05; 345/156–184
See application file for complete search history.

(56) References Cited

U.S. PATENT DOCUMENTS

| | | | | |
|---|---|---|---|---|
| 4,506,354 A * | 3/1985 | Hansen | | 367/101 |
| 5,274,363 A | 12/1993 | Koved | | |
| 5,367,614 A * | 11/1994 | Bisey | | 345/419 |
| 5,650,799 A * | 7/1997 | Melen | | 345/172 |
| 5,739,814 A * | 4/1998 | Ohara et al. | | 345/173 |
| 6,130,663 A | 10/2000 | Null | | |
| 6,137,427 A | 10/2000 | Binstead | | |
| 6,313,825 B1 | 11/2001 | Gilbert | | |
| 6,614,422 B1 * | 9/2003 | Rafii et al. | | 345/168 |
| 6,937,227 B2 | 8/2005 | Qamhiyah | | |
| 7,078,911 B2 | 7/2006 | Cehelnik | | |
| 7,081,884 B2 | 7/2006 | Kong | | |
| 7,092,109 B2 | 8/2006 | Satoh | | |
| 7,130,754 B2 | 10/2006 | Satoh | | |
| 2002/0024506 A1 * | 2/2002 | Flack et al. | | 345/169 |
| 2005/0273533 A1 * | 12/2005 | Hughes | | 710/62 |
| 2006/0092022 A1 | 5/2006 | Cehelnik | | |
| 2006/0161871 A1 | 7/2006 | Hotelling | | |
| 2006/0256090 A1 | 11/2006 | Huppi | | |

* cited by examiner

*Primary Examiner* — Kenneth Bukowski

(57) ABSTRACT

A system (100) and method for a touchless tablet that produces a touchless sensory field over a form (111). The touchless tablet includes a touchless sensing unit (110) for identifying a finger action above the form, and a controller (130) communicatively coupled to the sensing unit for associating the finger action with at least one form component on the form. The touchless tablet identifies a selection of a form component (122) based on a location and action of the finger above the form. A display (140) connected to the touchless tablet can expose a graphical application, wherein a touchless selection of a form component corresponds to a selection of a graphical component on the graphical application.

18 Claims, 6 Drawing Sheets

TOUCHLESS TABLET METHOD AND SYSTEM THEREOF

CROSS-REFERENCE TO RELATED APPLICATIONS

This application claims the priority benefit of U.S. Provisional Patent Application No. 60/781,177 entitled "Method and System for a Touchless Tablet" filed Mar. 13, 2006, the entire contents of which are hereby incorporated by reference.

This application also incorporates by reference the following Applications: Ser. No. 11/683,410 entitled "Method and Device for Three-Dimensional Sensing", Ser. No. 11/683,412 entitled "Application Programming Interface (API) for Sensory Events", Ser. No. 11/683,413 entitled "Visual Toolkit for a Virtual User Interface", Ser. No. 11/683,415 entitled "Virtual User Interface Method and Device Thereof".

FIELD

The present embodiments of the invention generally relate to the field of computer accessories, more particularly to user interfaces.

BACKGROUND

Tablets are devices which allow a user to visualize electronic text on a display. A user can interact with the tablet by touching the tablet with a stylus. For example, a user can fill out an electronic form by writing on the tablet much like writing on a piece of paper using a pen. The tablet can detect a physical pressing of the stylus on the screen and interpret the information written by the user. Tablets can vary in size but are generally approximately the size of a sheet of paper. Alternatively, a tablet can include a touchscreen which can be physically touched by a user. A user can touch the touchscreen in a manner similar to the way a stylus is used: that is, through a physical interaction.

Tablets, touch screens, and touch panels are typically pressure-sensitive (resistive), electrically-sensitive (capacitive), acoustically-sensitive (SAW—surface acoustic wave) or photo-sensitive (infra-red). Such displays can be attached as accessory devices to computers or communication devices. Tablets can be considered an electronic substitute to the pen and paper. Although tablets have proven useful, some consumer are interested in smaller display devices that are more portable. A need therefore exists for a compact device which provides improved portability and use.

SUMMARY

One embodiment is directed to a touchless tablet. The touchless tablet can include a sensing unit for identifying a touchless finger action above a form, and a controller that associates the finger action with at least one form component in the form. The touchless tablet can identify a selection of a form component based on a location and action of the finger above the form. In one arrangement, the touchless tablet can further include a projecting element for presenting a visual layout of graphical components corresponding to the form components. In another arrangement, the projecting element be a camera to capture a layout of form components on a form sheet. In one aspect, the finger action can include at least one of a touchless depressing action, a touchless release action, a touchless hold action, and a touchless dragging action. In another arrangement, the touchless tablet can be communicatively coupled to a display for exposing a graphical application, such that a touchless selection of a form component corresponds to a selection of a graphical component in the graphical application. The selection of a form component can perform an action on the form object that produces a response from a graphical component in the graphical application.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
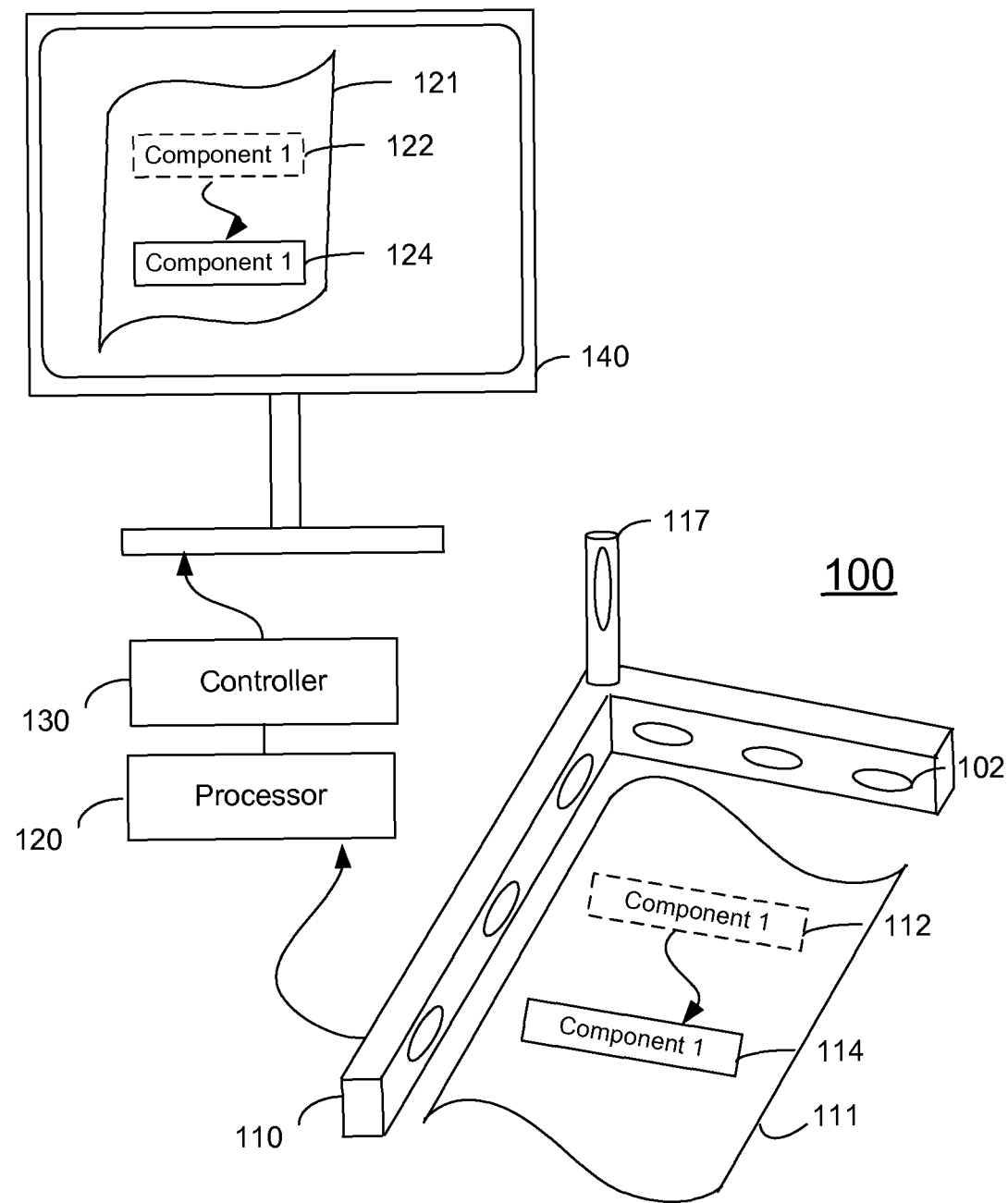
FIG. 1 illustrates a first embodiment of a touchless tablet in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The term touchless sensing is defined as sensing movement without physically touching. The term activating or activation is defined as enabling, disabling, or moderating a control. An activation cue can be a physical motion such as a finger movement, hand gesture, or a spoken utterance. The term touchless sensory field or sensory space, in this disclosure, can be defined as either a sensing field or a viewing field. The term sensing field can be defined herein as a region that is monitored for changes such as changes in acoustic pressure level, for example, a sound wave. The term viewing field can be defined herein as a region that is monitored for changes such as changes in intensity, such as light, for example, pixel intensity.

Referring to FIG. 1 a touchless tablet 100 is shown. The touchless tablet 100 can include a sensing unit 110, a processor 120, and a controller 130. The touchless tablet 100 can connect to a communication device hosting the display 140 through a wired or wireless connection. The display 140 can present graphical components 122-124 associated with form components 112-114 on a form 111. Briefly, the sensing unit 110 can produce a touchless sensory field above the form 111, and the processor 120 can detect finger movement within the touchless sensory field over the form 111. The controller 130 can identify finger actions applied to form components in the form 111 and translate the finger actions to components in the graphical application 121. The sensing unit 110 can include an off-axis sensory element 117 which can further detect touchless movements and which can also capture a picture of the form 111, or project an image on the form 111.

Briefly, the touchless tablet 110 can detect finger movement above the form, and identify a location of the finger within the form 111. As an example, a user can position a finger over a form component 121, and the touchless tablet 100 can identify a location of the selected form component corresponding to a detected location of the finger. The user can also perform a touchless action on the form component, such as a touchless push action, a slide action, a drag action, a hold action, and a release action. For example, the user can select form component 112 by positioning the finger above the component 112 and pushing down. This can activate the corresponding graphical component 122 on the display 140. The user can slide the finger 112 while held down to a new location 113, and lift the finger up. The sensing unit 110 can detect the finger push, hold, and release actions and move the graphical components 122-124 corresponding to the form components 112-114 on the display 140. The sensing unit 110 can detect constant velocity movement and accelerated movement to identify finger actions.

In one arrangement, prior to using the touchless tablet, a user can download a form layout to the processor 120, or computer hosting the graphical user interface 121. The form layout identifies locations of the form components in the form 111. Next, the user can position the form 111 within the touchless sensory of the sensing unit 110. The form 111 can be a sheet of paper containing printed material or graphical components at locations known to the touchless tablet 100, based on the downloading of the form, or to a computer system communicatively coupled to the touchless tablet. The form 111 can be a sheet of paper, a presentation, or a brochure. The processor 120, or computer, can then associate locations in the touchless sensory field with the locations of form components. Alternatively, the sensing unit 110 can capture an picture of the form 111, and the processor 120 can identify locations of the form component from the picture, if the form is not downloaded.

In other arrangements, the sensing unit 110 may not have information with regard to the location of the form components in the form 111. Accordingly, the sensing unit 110 is limited to only identifying an absolute location of the finger within the touchless sensory field, such as an absolute coordinate. The touchless sensory field can be demarcated by bounds along two dimensions, such as an X and Y direction. Notably, the sensing unit 110 can estimate a location and relative movement of a finger within the bounds of the touchless sensory field. When the form sheet is correctly positioned within the touchless sensory field, a one to one correspondence of finger location can be determined with the location of the form. For example, the form sheet can be 8×11 inches and positioned such that the top of the form just touches the vertical aspect of the sensing unit 110, and the side of the form just touches the horizontal aspect of the sensing unit 110. Accordingly, a detection of the finger within the touchless sensory field can be correlated to a position on the form 111 when correctly positioned. The alignment provides a one-to-one correspondence of the finger location relative to the position of the form. In addition, the off-axis element 117 can project a bounds of the frame to aid the user in identifying the placement of the form. For example, a LED or laser light source can project the outline of a standard size form on a surface, such as a desk. However, such an arrangement only provides limited information for interfacing with the touchless tablet.

In another arrangement, the touchless sensing unit can project a virtual layout of virtual components corresponding to form components already printed on the form 111. For example, the form sheet 111 may be a printed publication with already existing form element, such as a menu or list. The form elements 112 can be identified by coordinates. For example, a list of form coordinates can be generated specifying the form component and its location on the form sheet. This list can be provided to the sensing unit 110. Accordingly, the off-axis element 117 can generate a virtual layout of virtual components that correspond in location with the printed form components given the positional information in the list. Understandably, in this arrangement, the sensing unit 110 is given positional information of the printed form components on the form. The sensing unit can then create a virtual layout based on the provided location of the form components. The virtual layout can be projected by the off-axis element 117 onto the form sheet. Supplemental to providing positional information to the sensing unit 110, the off-axis element 117 can be a camera to capture an image of the form 111. The camera can also capture a location and motion of a finger action. The graphical components on the form sheet can be identified from the image as well as the finger location and movement. The coordinates of the form components from the image can be determined, and a virtual layout of virtual components corresponding to the coordinates of the form components can be created. Hidden attributes can also be embedded within the image for identifying form components to associate with graphical components. That is, the processor 120 can identify hidden attributes for identifying a location and function of a form component. For example, a form manufacturer may place watermarks within the form which can identify the location, function, and method of finger action required to interact with the form component.

In yet another arrangement, the touchless sensing unit 110 can project a visual layout of graphical components on the form. Whereas a virtual layout is not visible, a visual layout is visible. The form may be a blank sheet of paper or a flat surface. For example, the off-axis element 117 can project a visual layout of graphical components on a blank form, or a table surface. The off-axis element 117 can be a small light projector that produces a light field of components on the form. The visual display can be a fixed presentation of form elements on the form, or it can be a changing presentation of form elements. The sensing unit 110 which produces the visual layout, knows the location of the graphical components within the visual layout when projected on the form. Accordingly, a location of a finger detected within the touchless sensory field can be correlated to a graphical component in the visual layout.

In practice, the processor 120 can identify a location and action of the finger and generates a coordinate object. The controller 130 can convey the coordinate object to the graphical application 121 which can then control graphical components according to the coordinate object. In one arrangement, the graphical application 121 can implement a sensory Applications Programming Interface (API). The sensory API can include functions, methods, and variables which provide communication access to the touchless sensing unit 110. By implementing the sensory API, the touchless tablet 122 can provide a virtual user interface (VUI) to the graphical application 121. This allows a user to control the graphical application 121 using the touchless tablet 100.

Figure 2:
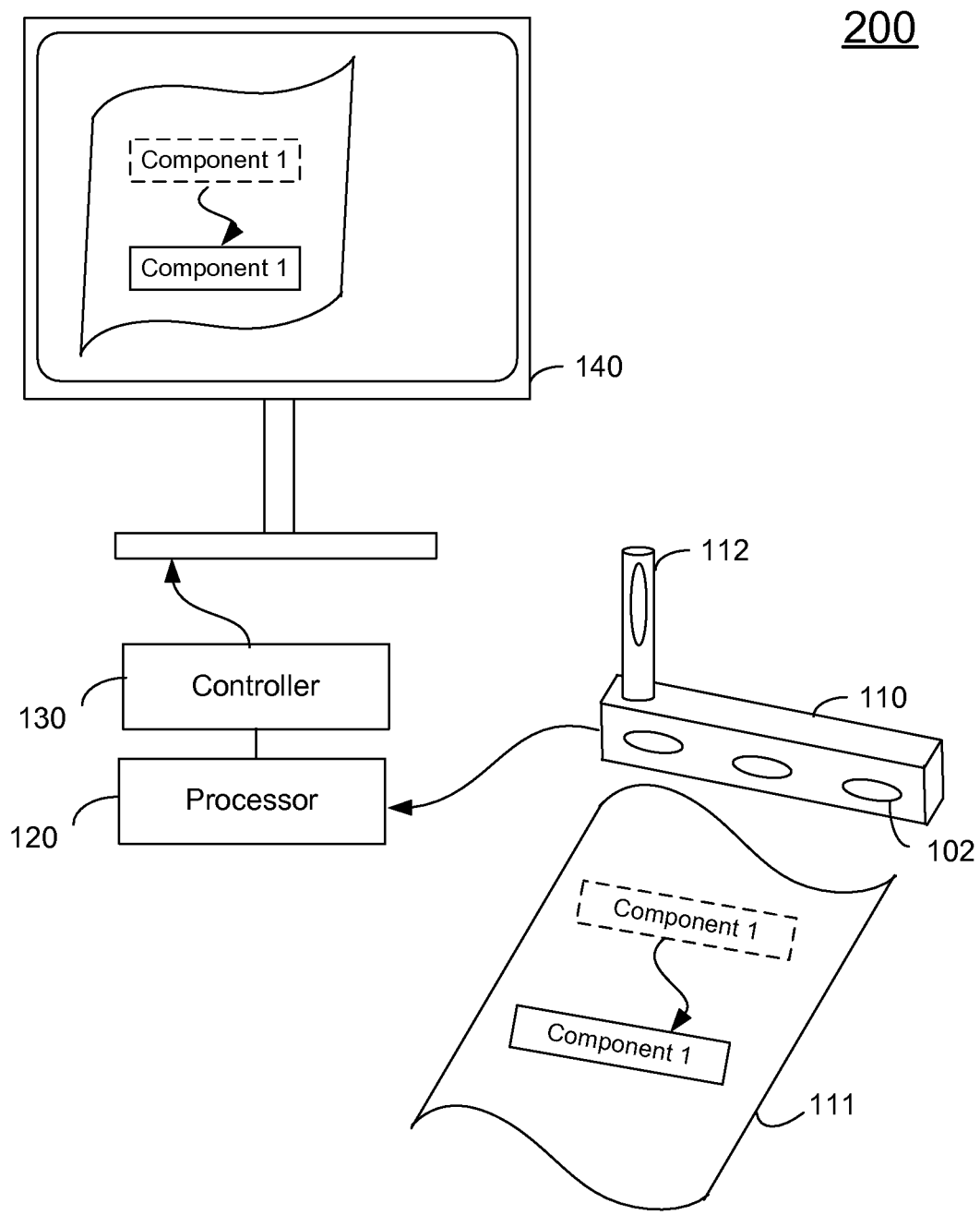
FIG. 2 illustrates a second embodiment of a touchless tablet in accordance with the inventive arrangements.

Referring to FIG. 2, a compact version of the touchless tablet 100 is shown. Notably, the touchless sensing unit 110 does not include one of the approximately perpendicular sensing arrays. The sensing unit 110 can detect movement with a touchless sensory field above the form 111. For example, the sensing unit 110 can detect forward and backward movement as well as a downward or upward finger movement. In one aspect, the sensing unit 110 without the off-axis element 117 is capable of identifying two dimensional motion within a plane parallel to the form 111. The off-axis element 117 allows the sensing unit 110 to determine movement orthogonal to the plane; that is, upward and downward movement. A user can position the sensing unit 110 at the top of a form sheet for generating a virtual sensory field over the form 111. In another arrangement, a planar scanning field can be generated without the off-axis element to identify when a finger has obstructed the plane, for example using laser scanning. A user can position a finger over a form component and perform a finger action to control a graphical component in the display 140 associated with the form component. The user need not touch the form. However, a microphone can be included within the sensing unit 110 to acknowledge that a finger action has occurred. For example, the sensing unit 110 can also localize a sound of a finger tap.

Figure 3:
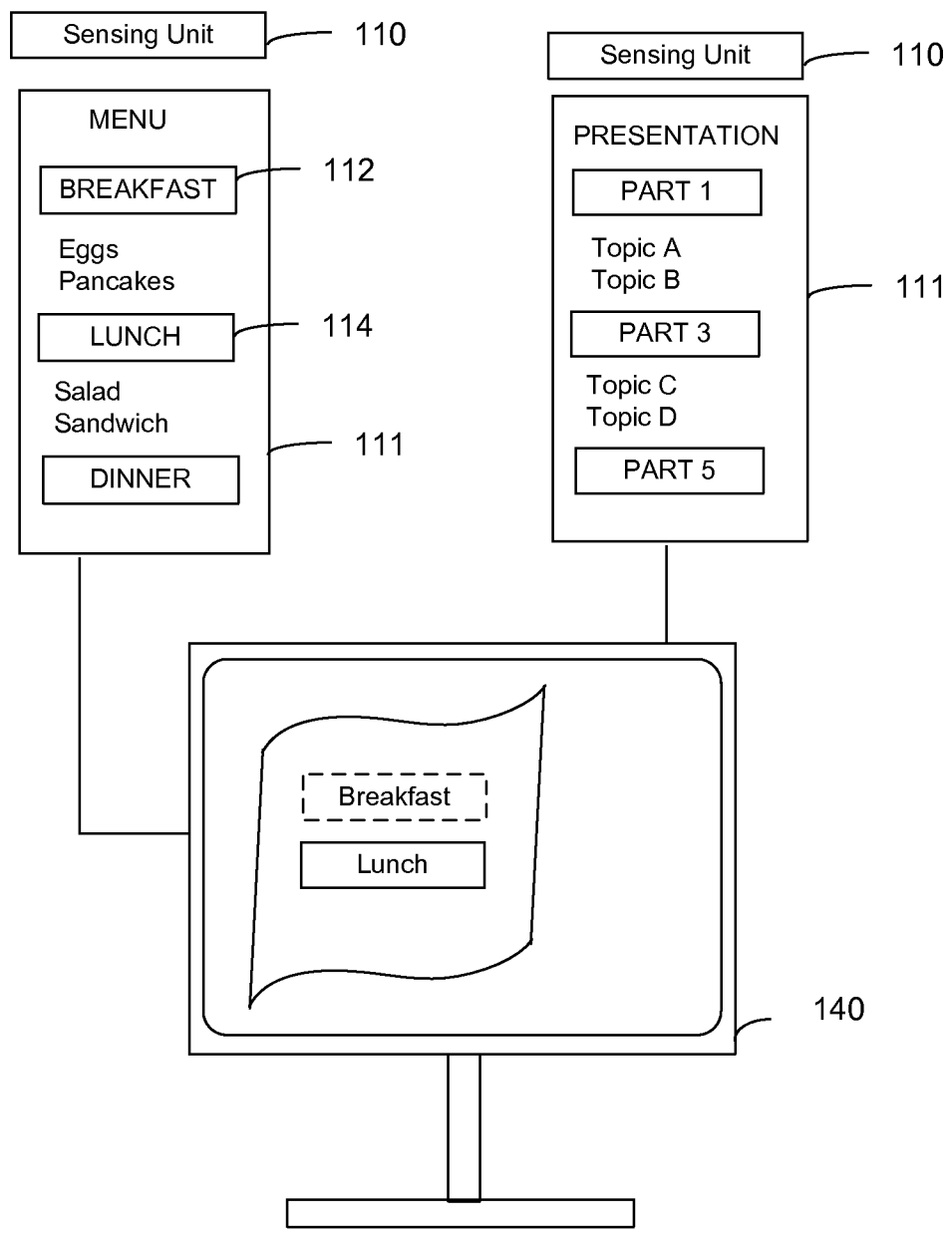
FIG. 3 shows a form for use with the touchless tablet in accordance with the inventive arrangements.

Referring to FIG. 3, an exemplary form 111 is shown. For instance, the form 111 can include form elements 112 and 114. The form 111 can be presented on the display 140. The sensing unit 110 can be positioned along the form 111 to allow a user to select items on a menu or a list that will be recognized on the display 140. For example, within a restaurant environment or a conference environment, the sensing unit 110 can identify items selected by a user. The sensing unit 110 can relay the identified items on the form to a server or a computer capable of processing the information. Those skilled in the art can appreciate that the embodiments of the invention can be utilized in various other contexts herein contemplated within the scope of the invention, and are not herein limited to the examples presented.

Figure 4:
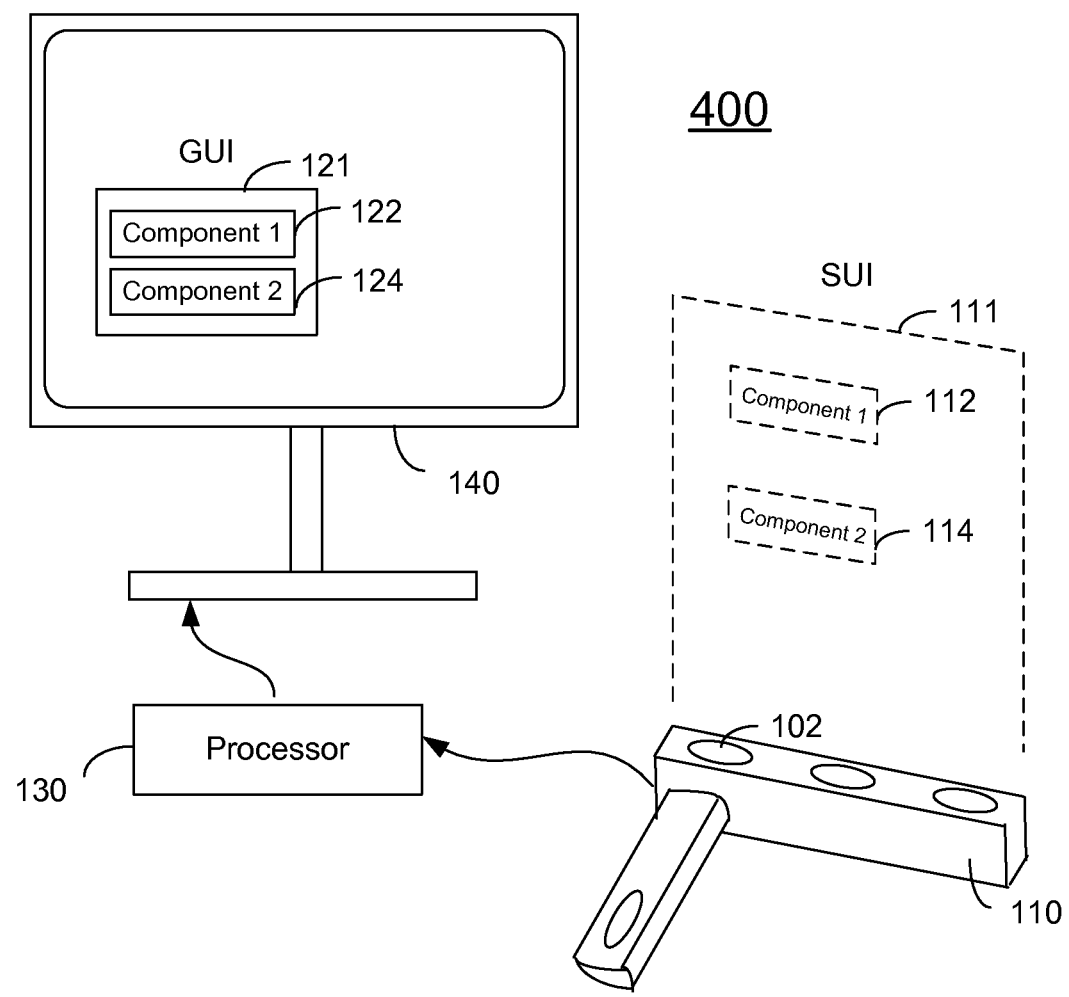
FIG. 4 illustrates a first embodiment of a touchless screen in accordance with the inventive arrangements.

Referring to FIG. 4, a virtual screen 400 is shown by positioning the touchless sensing unit 110 on a side. A user can interact with the graphical application 121 on the display 140 through the virtual screen 400. In this case a form is not needed. For example, a user can move a finger along a horizontal and vertical direction parallel to the virtual sensory field 111. The user can push the finger forward to activate a virtual component 112 which in turn activate the corresponding graphical component 122 on the display 140. In one arrangement, the virtual screen may not be visible. Accordingly, a location of the user's finger within the virtual sensory field can be presented on the display 140. This provides the user visual feedback for navigating around the application. Accordingly, the relative movement can be detected in the virtual screen for identifying finger movement and location. In another arrangement, a backdrop can be placed behind the sensing unit 110 to provide a surface on which the virtual field can be projected. In yet another arrangement, the virtual sensory field can be produced as a hologram.

Figure 5:
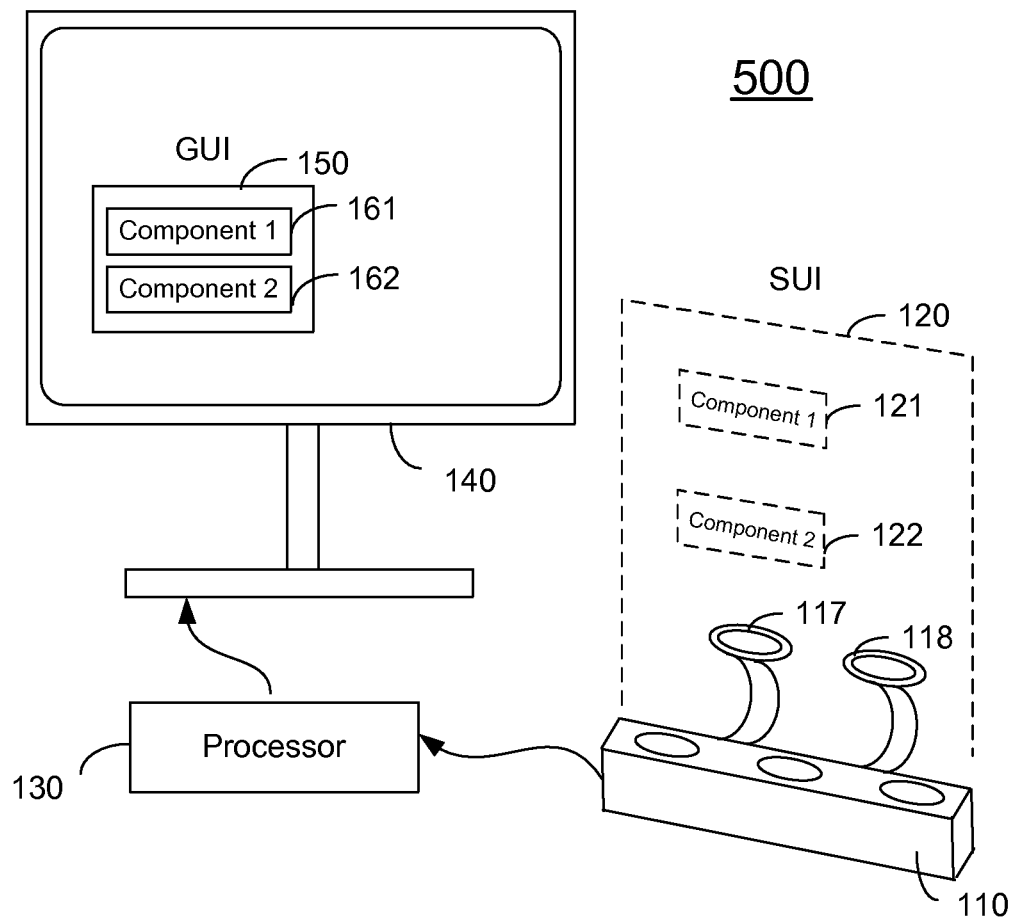
FIG. 5 illustrates a second embodiment of a touchless screen in accordance with the inventive arrangements.

Referring to FIG. 5, a virtual screen 500 is shown. Notably, the sensing unit 110 includes two off-axis elements 117 and 118 which are positioned on an opposite side from that shown in FIG. 3. The touchless interface of FIG. 4 also provides 3D sensing of finger location and action.

Figure 6:
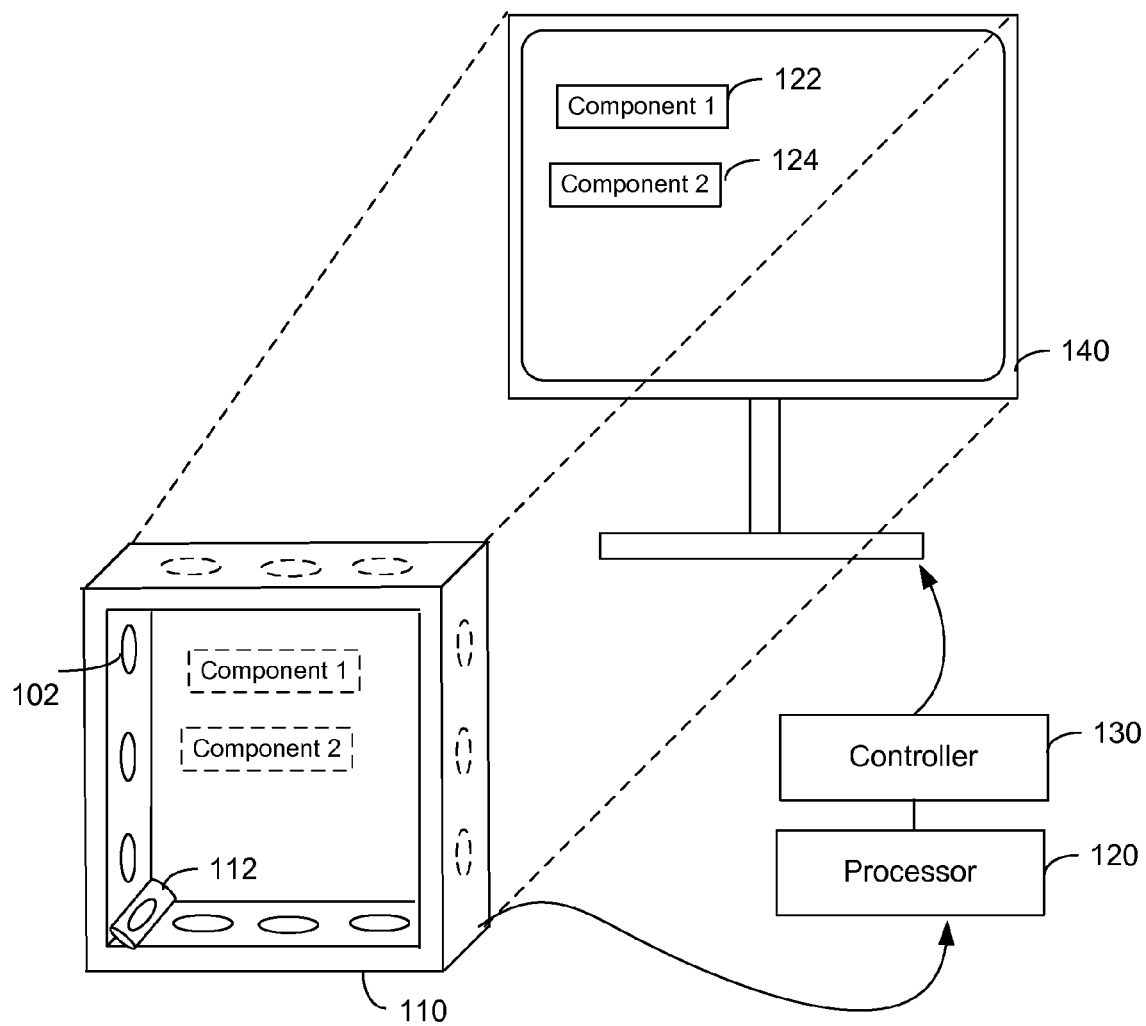
FIG. 6 illustrates a virtual touchscreen in accordance with the inventive arrangements.

Referring to FIG. 6, a virtual touchscreen 600 is shown. In particular, the virtual touchscreen 600 can include multiple touchless sensing units 110 arranged around the display 140 for providing 3D user interaction. Notably, the touchless sensory field is produced over the display thereby allowing a user to use the display as a touchscreen, though, without requiring the user to touch the display, and providing a third dimension of depth interaction.

A method of navigation for a touchless tablet, a virtual screen, and a virtual touchscreen is provided. The method can be practiced when the sensing unit 110 uses acoustic sensing elements for creating a sensing field, or when the sensing unit 110 uses optical sensing elements for creating a viewing field. The method can include creating a three dimensional (3D) sensory space, determining a finger position within the 3D sensory space, determining one of a forward or retracting finger movement associated with the finger position, and controlling a user interface according to the finger movement. The user interface may be a graphical user interface providing visual information or an audible user interface providing audible information. For example, referring back to FIG. 1, the processor 120 can determine a two dimensional position of a finger within the touchless sensory field. The processor 120 can also determine a first depth of a finger during a forward finger movement within the 3D sensory space. This can be the case when a user has engaged a form component 112 to produce an action on a graphical component 122 in the graphical application 121. The processor 120 can then determine a second depth of the finger during the forward movement within the 3D sensory space. The processor 120 can create a vector from the first and second depth, and predict a destination of the finger on the graphical application from said vector. The processor 120 can also determine a velocity and an acceleration for adjusting a direction of the vector. The processor 120 can also track a movement for identifying repetitive motion or reverse actions such as the moving forward and backward for detecting a button press. For instance, the destination can be graphical component 122.

The processor 120 can adjust a region of focus within the graphical application 121 based on the destination. The region of focus can correspond to a higher resolution of sensing. For example, increasing a region of focus can correspond to increasing the pulsing rate of an emitter element. More pulses per second result in a finer ability to resolve a location or a relative displacement. A region of focus can also increase attributes of a graphical component. For example, as a user pushes increasingly downward, for emulating a push button action, a graphical component can increase in size to provide visual feedback to the user that the graphical component will be activated. The graphical components identified as targets can be visually distorted to let the user see which component is being targeted as the destination. For example, an exaggerated zoom lens can be applied to the graphical component indicating that it is being selected. In one aspect, adjusting a region of focus includes one of accelerating and decelerating a movement towards the destination. This includes zooming in on the region of focus in view of the destination.

A cursor object can also be presented on the display that moves in accordance with finger movement within the touchless sensory field. The cursor can change in color, a size, a shape, or behavior to provide visual feedback. The graphical application 121 can present a distorted image of an object on the display that moves in accordance with the finger movement within the 3D sensory space. For example, the graphical application 121 can receive coordinate information concerning movement of the finger within the touchless sensory field to visually identify navigation. In one aspect, a distant depth of the 3D sensory space corresponds to a broad region, and a close depth of the 3D sensory space corresponds to a narrow region of focus. A region of focus can broaden when the user's finger is farther from a sensing unit producing the 3D sensory space, and the region of focus can narrow when the user's finger is closer to the sensing unit. The graphical application 121 can present the destination and the region of focus on the display to provide visual feedback.

A method of control in the virtual screen includes producing a touchless sensory field, and adjusting the strength of the touchless sensory field for adjusting a detection of a finger within the touchless sensory field. The method can be practiced when the sensing unit 110 uses acoustic sensing elements for creating a sensing field, or when the sensing unit 110 uses optical sensing elements for creating a viewing field. Adjusting the field can include increasing amplification or decreasing the amplification of the touchless sensory field. For example, the processor can amplify or decrease the amplitude of an emitted pulse for adjusting the field strength. The strength of the field determines the sensitivity and resolution for resolving location and measuring movement within the field. A change in vertical and horizontal position of the finger controls a navigation within the graphical application 121. A change of forward or retracting movement can activate a graphical component 122 within the graphical application 122. The processor 120 can track finger movement and smooth out perturbations in the track. The processor 120 can determine at least one of an absolute location of the finger, a relative displacement of the finger, a velocity of the finger, a length of time of the finger, and acceleration of the finger. The processor 120 can also set thresholds for identifying a finger action such as a touchless button press. For example, the required depth of a button press can be changed by adjusting the coordinate bounds for the button, or by changing the field strength.

As previously noted, one exemplary embodiment provides touchless navigation control using a sensing unit comprised of ultrasonic elements. It will be apparent to one of ordinary skill, however, that the sensory aspects of the invention apply equally well across other sensing technologies. For example, the sensing elements of the sensing unit can comprise a microphone array system, a beam forming array, a three-dimensional imaging system, a camera system, a laser system, or any combination thereof for acquiring finger movement and a finger location for converting finger movement into a coordinate signal for navigating within a display as herein presented. For example, a base section can comprise ultrasonic elements, and the off-axis element can be a camera element.

Referring back to FIG. 1, in an exemplary embodiment only, the sensing unit 110 can contain at least one array of ultrasonic sensors. The sensors can create a three-dimensional sensing field that allows the sensing unit 110 to identify and track a location of an object within the sensing field. The sensing unit 110 can employ principles of pulse-echo detection for locating the position of an object within a sensory field. The intensity and sensitivity area of the sensing field depends on the signal strength of the signals pulsed out from the transmitters, and the ability of the sensing unit 110 to resolve echo signals. In a pulse-echo system, a transmitter emits a high frequency and high energy pulse which may be reflected off an object. If the object is within close proximity, a reflection signal will be generated from the scattering of the high energy pulse on the object. Reflection signals will be sent back towards the sensing unit 110 that can be captured by receiver elements (transducers). Notably, the signal is generally high frequency as less energy is disipitated during transmission and reception of a high frequency pulse in air. Ultrasonic transducers and special sonic acoustic transducers are capable of operating at high frequencies such as 40 KHz. In a pulse-echo system a pulsed signal is transmitted towards an object and a reflection signal is identified. A time of flight measurement describes the time expiring between when the signal was emitted and when the signal was received.

The touchless sensory field is an approximate three dimensional region wherein a finger movement can be identified by the sensing unit 110. For example, when the sensing unit is an ultrasonic sensing unit that emits a high energy pulse, the field of view corresponds to that region within which a reflected high energy pulse can be detected. The field of view can be a function of the emitted pulse strength and the range (e.g. distance). A user can move the finger within the field of view and the processor 120 can detect a position of the finger. The sensing unit 110 can also include a timer for determining a length of time a finger is at a position. The processor 120 in conjunction with the timer can determine a finger location and a finger action. The processor 120 can also include a buffer for storing prior coordinate information. Notably, a finger push action generally corresponds to a movement from a first position to a second position and then back to the first position. Accordingly, the processor tracks finger movement and compares the movement with prior history of movement for determining when a push action has been initiated.

In the exemplary embodiment, the sensing unit 110 can include at least one transmitter 102 and at least two receivers for transmitting and receiving ultrasonic signals. The transducers can be omni-directional ultrasonic transducers be the same for providing dual transmit and receive functions. The sensing unit can employ pulse-echo detection to estimate a range and position of an object within view of the sensing elements. A transmitter in the sensing unit can emit a pulse shaped signal that reflects off an object which is detected by a receiver element in the sensing unit. The receiver element can be coupled with a detector (e.g. processor 120) to detect a signal reflected off an object as part of the motion detection logic in the sensing unit. The detector can include additional processing logic such as thresholds, comparators, logic gates, clocks, and the like for detecting an object's motion. The sensing unit 110 calculates a position of the object causing the reflection by solving a set of geometric equations.

As an example, the single transmit and receive element pair along a same plane in the ultrasonic sensing unit calculates a first range (e.g. distance) of an object in the field of view. A first transmit and receive pair on an x-axis can estimates a longitudinal range of the object (e.g. finger). A second pair, arranged separately from the first pair, estimate a second range. The second pair estimates a latitudinal range of the object (e.g. finger). Accordingly, the two range measurements establish a position (e.g. location) of the object causing the signal reflection by mathematically combining the geometrically related range measurements. For example, the first range measurement establishes a x-coordinate and the second range measurement establishes a y-coordinate. The location of the object is then determined to correspond to the point (x,y) in a single plane. For example, the plane will be oriented in the direction of the first and second paired ultrasonic elements. Accordingly, a third pair can produce a range measurement in a third direction thereby establishing a three-dimensional coordinate system (x,y,z) if the first, second, and third range measurement projections are orthogonal to one another.

A time of flight associated with a first transmit and receive pair produces a complex surface wherein a location of the object can be anywhere along the complex surface. That is, a single time of flight measurement produces a locus of points in a three dimensional space that describe a possible location of the object producing the time of flight. When a second transmit and receive pair is included, a second complex surface can be generated wherein a location of the object can be anywhere along the second complex surface. Based on the location of the transmitters, the two complex surfaces can produce a parabolic intersection curve wherein the object can be anywhere along the parabolic curve. When a third transmit and receive pair is included in a symmetrical arrangement, a third complex surface can be generated wherein a location of the object can be anywhere along the surface of the third complex surface. A location of the object can be determined by identifying the intersection point between the parabolic surface generated by the intersection of the first and second complex surface, with the third complex surface. The location of the object can be uniquely specified by calculating the intersection of the three complex surfaces. Multiple complex surfaces can be generated for each paired sensor, and a location can be determined by identifying an intersection of the complex surfaces.

A relative movement of the object can also be determined by calculating the relative changes in TOFs from each of the transmit-receive pairs. Changes in TOFs can be directly used to look up a corresponding change in relative position. Changes in TOFs can be used to determine relative changes along the principal axes in the three dimensional space. Notably, as more transmit-receive pairs are added, the number of complex surfaces increases thereby providing redundancy as to the location and movement of the object in three dimensional space. The intersection can be calculated by projecting one complex surface onto another complex surface. A gradient descent approach or steepest descent can be used to solve for the local and global minima. Other iterative numerical solutions also exist for calculating the maximum likelihood point of the object. Multiple pulse-echo time of flight measurements can be captured for smoothing out the trajectory of the object in addition to an averaging of the location of the object. Pulse-echo principles can be applied to all the transducers 102 in the sensing unit 110. Each of the pair of transducers can be pulsed as emitter elements. That is, the sensing unit 110 can calculate a first set of time of flight (TOF) measurements using a first transducer as the emitter, calculating a second set of TOFs using the second transducer as the emitter, and so on, wherein each transducer is used as an emitter. Notably, the TOFs can be averaged over time to smooth out discontinuities in the measurements.

In one arrangement, a first ultrasonic signal can be emitted from a first transducer from a first direction at a first time. A first and second reflection of the ultrasonic signal off the finger from the first direction can be detected by a plurality of ultrasonic transducers 102. A location of the finger can be determined from time of flight (TOF) measurements calculated at each transmit-receive pair. The steps of emitting, detecting, and determining a TOF for multiple directions at multiple times for generating a plurality of finger locations can be repeated. In one aspect, a set of possible finger locations can be determined from the plurality of transmit-receive pairs. The set of finger locations can be correlated to determine a finger position having a highest likelihood of producing the reflections from the multiple directions. Also, the processor 120, can measure changes in TOF from each of the sensors 102. When all the TOFs decrease together, the processor 120 determines that the finger has moved closer. When all the TOFs increase together, the processor 120 determines that the finger has moved farther away. Such processing can be used for determining a button press action.

In one aspect, a first TOF and a first phase differential can be calculated between a signal emitted at a first time and a reflected signal detected at a first sensor. A second TOF and a second phase differential can be calculated between the signal emitted at the first time and a reflected signal detected at a second sensor. A third TOF and a third phase differential can be calculated between the signal emitted at the first time and a reflected signal detected at a third sensor. The calculations can occur in parallel to speed up computation time and the TOF and differentials can be calculated as they are received. Accordingly, a first estimate of a location of the object from the first TOF can be calculated, a second estimate of a location of the object from the second TOF can be calculated, and a third estimate of a location of the object from the third TOF can be calculated. At least three complex surfaces can be created as a function of the first, second, and third estimate of a location. An intersection of the at least three complex surfaces can be determined which can correspond to a coarse location of said object. The first, second, and third phase differential can be applied to the estimated location for updating the coarse location to a fine location of the object. In one aspect, the TOFs can be weighted by a phase differential. In one arrangement, for refining the trajectory of the object's movement, a history of the TOFs and the phase differentials can be tracked for predicting an error estimate, wherein the error estimate is used to produce the fine location of the object.

The sensing unit 110 can contain multiple sensing elements positioned and arranged in various configurations for receiving range measurements in varying directions for calculating the position of the object causing the reflection using multi-path signal processing techniques. The sensing unit is not limited to only three sensors which are provided as example. The paired transmit and receive elements can be on a same principal axis or a different principal axis. The sensing unit can also employ beam forming techniques and pattern recognition techniques for estimating the objects location. The sensing unit 110 additionally produces differential coordinate signals for satisfying the input signal requirements of a BlueTooth or USB connection interface. Notably, a computer mouse generally uses a PS/2 or wireless device driver for receiving differential signals for moving a cursor along each principal axis of the computer coordinate system. The sensing unit 110 produces differential signal for each principal axis to comply with the requirements of the PS/2 and USB mouse device driver interface.

Another embodiment is a virtual screen. The virtual screen can include a touchless sensing unit for creating a sensory field, a processor communicatively coupled to the touchless sensing unit for determining a finger location and a finger action within the sensory field, and a controller communicatively coupled to the processor and a display for controlling a graphical application according to the finger location and finger action. The finger action can be a finger push action, a finger hold action, a finger release action, and a finger slide action, or a combination. In one arrangement, the touchless sensing unit generates the sensory field over the graphical application on the display. In another arrangement, the touchless sensory field does not overlay the graphical application on the display. In this arrangement, the touchless sensory field does not spatially coincide with the graphical application. The processor can detect finger movements within the touchless sensory field for interacting with the graphical application on the display.

Another embodiment is a method of navigating a virtual screen. The method can include creating a three dimensional (3D) sensory space, determining a finger position within the 3D sensory space, determining one of a forward or retracting finger movement associated with the finger position, and controlling a graphical application according to the finger movement. In one aspect, a first and second depth of a finger during the forward or retracting finger movement within the 3D sensory space can be identified, a vector can be created from the first and second depth, a destination of the finger on the graphical application can be predicted from the vector, and a region of focus within the graphical application can be adjusted based on the destination. In one aspect, the destination and the region of focus can be presented on the display to provide visual feedback. A graphical interface component can be identified on the display corresponding to the predicted destination of the finger movement.

Another embodiment is a method of control in a virtual screen. The method can include producing a sensory field, and adjusting the strength of the sensory field for adjusting a detectability of a finger within the sensory field, wherein a change in a position of the finger controls a navigation within a graphical application, and a forward and retracting movement of the finger controls an action on a graphical component within the graphical application.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A touchless tablet comprising:
   a camera that takes a picture of a form,
   a touchless sensing unit operatively coupled to the camera for identifying a touchless finger action above the form within a three dimensional (3D) ultrasonic sensory space; and
   a controller communicatively coupled to said touchless sensing unit, wherein said controller
      determines a location of form components in the picture captured by said camera,
      creates a virtual layout of virtual form components in a three-dimensional ultrasonic touchless sensing space based on the location of the form components in the picture;
      presents on a display a visual layout of visual form components also based on the location of the form components in the picture,
      applies a combinational weighting of a Time of Flight (TOF) ultrasonic distance measurement corresponding to a coarse estimated location of the finger and a differential Time of Flight (dTOF) ultrasonic measurement corresponding to a relative displacement as the finger accelerates or decelerates between a far distance and a close distance;
      creates a vector from a first location at the far distance to a second location at the close distance for a forward finger movement, or, a vector from the first location at the close distance to the second location at the far distance for a retracting finger movement in the ultrasonic sensory space; and
      predicts a destination of the finger on said form from said vector to provide zoom in and zoom out and associates the touchless finger action in the ultrasonic sensory space on at least one virtual form component in the virtual layout of the three-dimensional ultrasonic touchless sensing space with at least one visual form component of the visual layout on said form and presented on the display based on the predicted destination,
   wherein said touchless tablet identifies a selection of said virtual form component based on said location and action of said finger in the three-dimensional ultrasonic touchless sensing space.

2. The touchless tablet of claim 1, further comprising an off-axis element placing the camera above the touchless finger actions to capture the picture of said form using optical camera elements, and said controller identifies form components in said picture and creates graphical components on a display corresponding to said form components of said picture.

3. The touchless tablet of claim 1, wherein said sensing unit further comprises:
   a detector, wherein said detector identifies a position of said finger in a sensory field above the form by
   emits a plurality of ultrasonic pulses from a first ultrasonic transducer configured to transmit the ultrasonic pulses;
   estimates for a plurality of ultrasonic transducers a time of flight between transmitting one of the ultrasonic pulses and receiving a reflected ultrasonic signal corresponding to a reflection off the finger;
   calculates for the plurality of ultrasonic transducers a differential receive time between the reflected ultrasonic signal and a previously received reflected ultrasonic signal, and
   determines a location and relative displacement of the finger from a combination of said time of flight measurements and said differential receive time measurements for mapping the virtual components of the VUI to the user components of the UI; and a timer cooperatively connected to said detector, wherein said timer determines a length of time said finger is at a position over a form component.

4. The touchless tablet of claim 3, wherein said plurality of ultrasonic transducers are microphones that alternate between capturing a sound of a finger tap on a surface presenting said form component and reflected ultrasonic signals off the finger, such that said detector affirms said position of said finger when said sound of said finger tap is detected.

5. The touchless tablet of claim 1, wherein said touchless tablet is:
a portion of a frame positioned on an adjacent second side of said form to allow a user to see an unobstructed view of said form,
wherein said frame contains at least one sensory element for detecting a finger movement within said frame.

6. The touchless tablet of claim 1, wherein said finger action includes at least one of a touchless depressing action, a touchless release action, a touchless hold action, and a touchless dragging action.

7. The touchless tablet of claim 1, where the display is communicatively coupled to said touchless tablet for exposing the graphical components, wherein said selection of a form component within a sensory field above the form corresponds to a selection of the graphical component on said display.

8. The touchless tablet of claim 1, wherein said selection performs an action on the form object that produces a response from a graphical component in the graphical application, wherein the graphical component corresponds to the form component.

9. The touchless tablet of claim 2, wherein said touchless sensing unit comprises:
a fixed array of ultrasonic transducers positioned on at least one side of a form for producing a sensing field over said form for determining a first and second coordinate of a finger within said sensing field;
the off-axis element comprises an ultrasonic transducer for providing a third dimension of ultrasonic sensory measurement for determining a third coordinate of said finger within said sensing field; and
a processor for determining a three-dimensional coordinate and action of said finger within said sensing field.

10. A virtual screen comprising:
a sensing unit containing an arrangement of sensing elements for generating an ultrasonic touchless sensory field representing the virtual screen;
a camera that takes a picture of a form, where the form is thereafter not needed and removed,
a processor communicatively coupled to said touchless sensing unit and the camera for
determining a location of form components in the picture captured by said camera,
creating a virtual layout of virtual form components in said ultrasonic touchless sensory field based on the location of the form components in the picture;
presenting on a display a visual layout of visual form components also based on the location of the form components in the picture
determining a touchless finger location and a touchless finger action within said touchless sensory field; and
associating the touchless finger location and touchless finger action on a virtual form component in the virtual layout with a visual form component in the visual layout, and
controlling a graphical application of the visual form component according to said touchless finger location and said touchless finger action la applying a combinational weighting of a Time of Flight (TOF) ultrasonic distance measurement corresponding to a coarse estimated location of the finger and a differential Time of Flight (dTOF) ultrasonic measurement corresponding to a relative displacement as the finger accelerates or decelerates between a far distance and a close distance to the sensing unit.

11. The virtual screen of claim 10, wherein said sensing unit comprises two or more acoustic transducer to produce the touchless sensory field.

12. The virtual screen of claim 10, wherein said finger action includes at least one of a finger push action, a finger hold action, a finger release action, and a finger slide action.

13. The virtual screen of claim 10, where the touchless sensory field is produced over the display that receives commands for controlling a graphical application on the display and provides a third dimension of depth interaction.

14. The virtual screen of claim 10, further comprising a communication unit for transmitting said finger action and location using at least one among a USB, a BlueTooth, and a ZigBee communication link.

15. The virtual screen of claim 10, further comprising a communication device that receives said finger location and action and adjusts at least one user interface control of the communication device.

16. A method of navigation in a virtual screen comprising:
capturing by way of a camera a picture of a user interface and determining a location of user interface components in the picture;
creating by way of an ultrasonic sensing unit a three dimensional (3D) sensory space with a virtual layout of virtual user interface components corresponding to the location of user interface components in the picture;
presenting on a display a visual layout of visual user interface components also based on the location of user interface components in the picture;
estimating a time of flight (TOF) between when an ultrasonic pulse is transmitted from a first ultrasonic transducer and when a reflection of said ultrasonic pulse off the finger in said 3D sensory space is received from a plurality of ultrasonic transducers;
estimating a differential time of flight (dTOF) between a first reflected ultrasonic signal and a second ultrasonic reflected received from the ultrasonic transducer for the plurality of ultrasonic transducers,
estimating a finger position within said 3D sensory space corresponding to one of the virtual user interface components in the virtual layout by applying a combinational weighting of the TOF and the dTOF as the finger accelerates and decelerates between a far distance and a close distance, where the TOF corresponds to an estimated location of the finger and the dTOF corresponds to a relative displacement of the finger;
determining one of a forward or retracting finger movement associated with said finger position; and
controlling the visual user interface component in the visual layout corresponding to the virtual user interface component according to said finger movement by adjusting a graphical portion of said user interface to where the finger is pointed with respect to said forward or retracting finger movement.

17. The method of claim 16, wherein said determining comprises:
identifying a first depth of a finger during said forward or retracting finger movement within said 3D ultrasonic sensory space;

identifying a second depth of said finger during said forward or retracting finger movement within said 3D ultrasonic sensory space;

creating a vector from said first and said second depth based on said TOF and said dTOF ultrasonic measurements;

predicting a destination of said finger on said graphical application from said vector; and adjusting a region of focus of a zoom-in and zoom-out of the graphical portion of said visual user interface based on said destination with respect to said forward or retracting finger movement.

18. The method of claim 17, wherein a distant depth of said 3D sensory space corresponds to a broad region and a close depth of said 3D sensory space corresponds to a narrow region of focus, such that said zoom-out broadens when the user's finger is farther from a sensing unit producing said 3D sensory space, and said zoom-in narrows when the user's finger is closer to said sensing unit.

* * * * *